United States Patent Office 3,004,951
Patented Oct. 17, 1961

3,004,951
DIGLYCIDYL ETHER OF DIHYDROXYPOLY-
CHLOROBIPHENYLS AND EPOXY RESINS
THEREFROM
Joachim Dazzi, Dayton, Ohio, assignor to Monsanto
Chemical Company, St. Louis, Mo., a corporation of
Delaware
No Drawing. Filed Sept. 26, 1958, Ser. No. 763,465
16 Claims. (Cl. 260—47)

This invention relates to a new class of diglycidyl ethers and to the epoxy resins made therefrom. More particularly this invention relates to the diglycidyl ethers of polychlorobiphenols and mixtures thereof, wherein the average number of chlorine atoms per biphenol molecule is at least 5.

Numerous diglycidyl ethers of polyphenolic compounds and the epoxy resins prepared therefrom are well known in the prior art. These compositions are prepared by the reaction of a halohydrin, e.g. epichlorohydrin, dichlorohydrin, and 1,2-dichloro-3-hydroxypropane, with a polyphenolic compound, e.g. hydroquinone, resorcinol, catechol, phloroglucinol, bis(p-hydroxyphenyl)methane (bisphenol F), bis(p-hydroxyphenyl)dimethylmethane (bisphenol A), 2,4-dihydroxyphenyl-4'-hydroxyphenyldimethylmethane, 4,4'-dihydroxybiphenyl, di(p-hydroxyphenyl)sulfone, long-chain diphenolic compounds, novolac resins, and the like.

The principal object of this invention is to provide an improved epoxy resin composition. Another object of this invention is to provide a novel class of epoxy resins which have improved resistance to burning and are particularly useful in providing insulation in electrical apparatus and materials. Still another object of this invention is to provide a novel class of diglycidyl ethers of polychlorobiphenols and mixtures thereof which can be readily cured by the addition thereto of a polychlorobiphenol of the same class as employed to produce the diglycidyl ether. Other objects and advantages of this invention will be apparent to those skilled in the art from the following disclosure.

It has now been found that the diglycidyl ethers of dihydroxypolychlorobiphenyls and mixtures thereof, wherein the average number of chlorine atoms per biphenol molecule is at least 5, have unique properties and provide a novel class of epoxy resins which are useful as surface coatings, for the casting of various simple and complex shaped objects, for the fabrication of various laminates, e.g. glass fiber laminates, and the like. The instant class of novel epoxy resins are particularly useful in the electrical industry in the coating of electrical wire and cable, the preparation of motor and transformer coils, fabrication of electrical capacitors, etc. The dihydroxypolychlorobiphenyls suitable for use in the instant invention can be illustrated by the structural formula

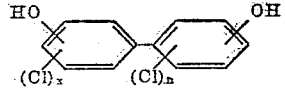

wherein the sum of $x$ and $n$ is a number from 5 to 8. The diglycidylation of the aforesaid class of diphenolic compounds can be illustrated as follows:

One method of preparing the dihydroxypolychlorobiphenyls is by the hydrolysis of a polychlorobiphenyl composition with an alkaline material such as sodium hydroxide, or potassium hydroxide, in an alcoholic solution as disclosed in U.S. Patent No. 2,449,088. The polychlorobiphenyls and mixtures thereof containing from about 62 to about 71 percent chlorine can be prepared by the direct chlorination of biphenyl in the presence of an iron catalyst as for example as shown in U.S. Patent No. 1,892,397.

The diglycidyl ether of the instant dihydroxypolychlorobiphenyls can be readily prepared by the reaction of the biphenol with an excess of epichlorohydrin, preferably from about 4 to about 10 moles per mole of the biphenol, in the presence of about 0.5 to about 1 mole of an alkali metal hydroxide, e.g. sodium hydroxide and potassium hydroxide, at a temperature of from about 90° C. to the reflux temperature of the mixture to effect the formation of the bis-1-chloro-2-hydroxy-3-glyceryl ether of the biphenol. Then the excess epichlorohydrin is distilled off and the reaction mixture diluted with an aromatic solvent such as benzene or chlorobenzene, and the intermediate is dehydrochlorinated by the addition thereto of from about 1.75 to about 2 moles of alkali metal hydroxide per mole of the original biphenol and refluxing the reaction mixture to form the diglycidyl ether. The alkali metal salts are then removed by filtration, decantation, washing, or other suitable means and the aromatic solvent distilled from the reaction mixture to recover the diglycidyl ether product.

The instant diglycidyl ethers can be converted to higher molecular weight epoxy resins and employed with the conventional curing agents. The present compositions can also be employed with other prior art epoxy compositions to modify their properties and produce a composition having a higher rate of reaction. In general, it is preferred that much mixed compositions contain at least about 50 percent of the polychloroepoxy resins of this invention. The instant diglycidyl ethers also can be readily cured by reaction with the dihydroxypolychlorobiphenyl compositions employed in the preparation of said ethers as further illustrated hereinafter.

The following examples are illustrative of this invention.

Example 1

A 2-liter, 3-necked, round-bottom flask equipped with a stirrer, dropping funnel, condenser and thermometer was charged with 411 g. (1 mole) of the dihydroxypolychlorobiphenyl composition obtained by the hydrolysis of a polychlorobiphenyl containing 68 percent chlorine. To this was added 556 g. (6 moles) of epichlorohydrin and the mixture was stirred together and heated to 90° C. Then 80 ml. (1 mole) of a 50 percent aqueous sodium hydroxide solution was introduced over a period of 17 minutes and a mildly exothermic reaction started when about 45 ml. of the caustic solution had been added over the first 7 minutes. The reaction mixture was refluxed for 40 minutes after the final addition of the caustic solution. Then the excess epichlorohydrin and the water from the caustic solution were distilled off through a 10-inch Vigreux column under reduced pres-

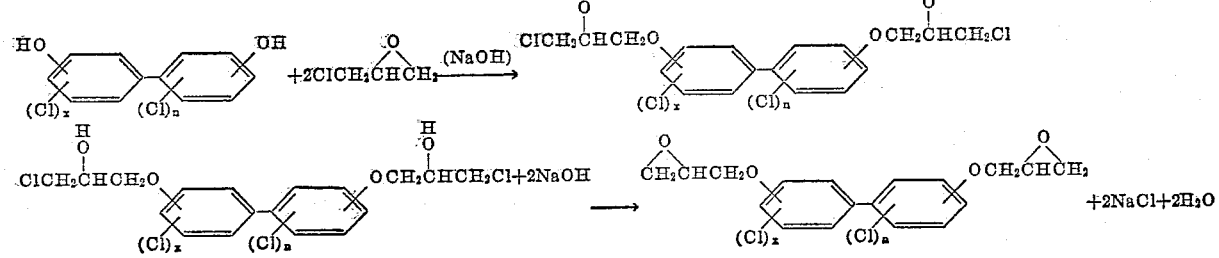

sure. The residue was held at 100° C. with good stirring under a pressure of 1 to 2 mm. of mercury for 20 minutes. The hot residue was diluted with 340 g. of benzene and heated to reflux. Then 160 ml. (2 moles) of a 50 percent aqueous sodium hydroxide solution was added thereto over a 10-minute period. Refluxing was continued and the water of addition and water formed in the reaction collected in a Dean and Stark trap over a period of about 2.5 hours after which time refluxing was continued for 4 hours. The reaction mixture was diluted with 400 ml. of benzene and then filtered and the residue washed with additional benzene. The benzene was recovered from the filtrate by distillation under reduced pressure and the final traces of benzene and volatiles removed by heating 20 minutes at 140° C. and 1 to 2 mm. of mercury. The light amber diglycidyl ether composition had a melting point of 49 to 50° C. and was analyzed for epoxy content, which was found to be 5.40 percent, corresponding to about 90 percent of theory for monomeric diglycidyl ether of the charged dihydroxypolychlorobiphenyl composition.

*Example 2*

This experiment was conducted in similar apparatus to that disclosed in Example 1. The reaction vessel was charged with 618 g. (1.5 moles) of the dihydroxypolychlorobiphenyl described in Example 1 and 832 g. (9 moles) of epichlorohydrin and the mixture heated to 95° C. with stirring. Then 120 ml. (1.5 moles) of a 50 percent aqueous sodium hydroxide solution was added over a period of 35 minutes and thereafter the mixture was refluxed for 40 minutes. After cooling to 58° C., 700 ml. of water was added and the mixture transferred to a separatory funnel whereby the wash-water aqueous phase was readily removed and the organic phase returned to the reaction vessel. The excess epichlorohydrin was removed by distillation at 100° C. under reduced pressure of 25 mm. and finally down to 2 mm. of mercury. Then 500 g. of benzene was added and the reaction mixture heated to reflux, after which 240 ml. (3 moles) of a 50 percent aqueous sodium hydroxide solution was introduced and refluxing continued for a total of about 13.5 hours and the water collected in a Dean and Stark trap. The hot solution was then decanted from the sodium chloride and a liter of benzene introduced, heated to reflux with stirring, and again decanted. The wash-decantations with benzene were repeated with two additional 800-ml. portions of benzene. The benzene solution was then filtered, the filtrate washed, then dried, and the benzene removed by distillation under reduced pressure. The light amber diglycidyl ether composition had a melting point of 46 to 47° C. and the epoxy content of duplicate samples was found to be 5.49 and 5.54 percent, corresponding to about 91 percent of theory for monomeric diglycidyl ether of the charged dihydroxypolychlorobiphenyl composition.

*Example 3*

A dihydroxypolychlorobiphenyl prepared by the hydrolysis of a polychlorobiphenyl containing 71 percent chlorine was identified as 4,4' - dihydroxyoctachlorobiphenyl. A 115.5-g. portion (0.25 mole) of said compound was introduced into a reaction vessel, equipped as in Example 1, then 231 g. (2.5 moles) of epichlorohydrin was added and the mixture brought to reflux. Then 0.1 mole of potassium hydroxide, as a 30 percent aqueous solution, was added thereto and the reaction mixture refluxed for 40 minutes. The excess epichlorohydrin was distilled off at 100° C. and 20 mm. mercury pressure and the residue diluted with 300 g. of chlorobenzene and heated to reflux. Then 0.44 mole of potassium hydroxide, as a 40 percent aqueous solution, was added over a 3-hour period and refluxing continued for 24 hours. The reaction mixture was filtered and the solvent removed at 100° C. and 1 mm. of mercury. The yellowish diglycidyl ether composition had a melting point of 60 to 64° C. and the epoxy content of duplicate samples was found to be 5.31 and 5.37 percent, corresponding to about 95.5 percent of theory for monomeric diglycidyl ether of 4,4'-dihydroxyoctachlorobiphenyl.

The instant diglycidyl ethers are unique in that they can be readily cured with the dihydroxypolychlorobiphenyl compositions employed in the preparation of the said ethers. In contradistinction thereto bisphenol A and tetrachlorobisphenol A do not cure the corresponding diglycidyl ethers respectively prepared therefrom. Up to about mole equivalents of the particular dihydroxypolychlorobiphenyl compositions are employed to effect the formation of a high molecular weight epoxy resin composition. From the analysis of the epoxy content of the particular diglycidyl ether it is possible to readily determine the quantity of dihydroxypolychlorobiphenyl required to produce the desired average molecular weight epoxy resin. Since the diglycidyl ether and diphenolic compositions are both difunctional the epoxy resin will be linear in the absence of materials and conditions effecting cross-linking through the hydroxyl groups. It also will be understood that greater than mole equivalents of the said diphenolic composition can be employed whereby up to 2 moles of the diphenolic composition can be reacted with the diglycidyl ether and the new resin composition will then contain substantially all phenolic terminal groups, which can in turn be reacted with additional diglycidyl ether to produce a high molecular weight resin by stepwise reactions. However, it is generally preferred to employ a one-step process using up to about 1 mole and preferably from about 0.5 to about 1 mole of the diphenolic composition per mole of the diglycidyl ether.

Also it has been found that the dihydroxypolychlorobiphenyl compositions employed to prepare the instant diglycidyl ethers can be used to cure other diglycidyl ether compositions. Thus the dihydroxypolychlorobiphenyl composition of Example 1 was found to effect rapid curing of the diglycidyl ether of bisphenol A at a temperature of 190 to 200° C. whereas bisphenol A per se failed to effect a cure of its diglycidyl ether at 200° C. over a period of about 18 hours, and tetrachlorobisphenol A also failed to effect a cure at 200° C. for 18 hours.

It has been found that the diglycidyl ether of 4,4'-dihydroxy-3,5,3',5'-tetrachlorobiphenyl can be prepared by the methods employed in the above examples. However, it was found that the dehydrochlorination step required up to about 50 hours, whereas the dehydrochlorination step for the instant diglycidyl ethers can be effected in 8 hours or less.

The instant diglycidyl ethers also unexpectedly have been found to react very rapidly in comparison with the prior art conventional epoxy compositions. For example, the instant diglycidyl ethers react very rapidly with drying oil fatty acids to provide coating compositions having good color, high flexibility and toughness, and pigmented formulations show excellent weather stability and flameproofing properties. Thus, the various diglycidyl ethers of the instant invention were found to react with soya fatty acids in a small portion of the time required for the reaction with prior art compositions. In several parallel experiments various diglycidyl ethers were reacted with soya fatty acids at 200° C. and the rate of esterification determined. In the heat-up period about 15 percent of the acid reacted with each of the diglycidyl ether of 4,4'-dihydroxy-3,5,3',5'-tetrachlorobiphenyl and the diglycidyl ether of bisphenol A, and their respective reaction times thereafter at 200° C. to effect esterification was 11.8 and 8.7 hours; about 20 percent of the acid reacted with the diglycidyl ether of tetrachlorobisphenol A in the heat-up period and the subsequent esterification reaction time was 6 hours; whereas about 85 percent of the acid reacted with the diglycidyl ether of the dihydroxypolychlorobiphenyl composition of the instant invention, which initially contained 70 percent chlorine, corresponding to an average of about 8 chlorine atoms per biphenol molecule, in the heat-up period and the subsequent esterification reaction time was 0.5 hour. Similarly the diglycidyl ether of the dihydroxypolychlorobiphenyl composition of the instant invention, which initially contained 62 percent chlorine, corresponding to an average of about 5 chlorine atoms per biphenol molecule, was materially more reactive than the prior art compositions in that it had an esterification reaction time of about 1.5 hours.

The instant diglycidyl ethers can also be cured with acid anhydrides in addition to the acids to provide high molecular weight, crosslinked, insoluble, tough, polymeric compositions which are useful as coating compositions. For example, a diglycidyl ether of the instant invention, such as produced in Example 1, was formulated with 50 weight percent of maleic anhydride to provide a composition which did not soften at 300° C. and exhibited an excellent adhesion to glass.

In addition the instant epoxy resins can be formulated with various other heat-reactive resins as, for example, phenol - formaldehyde, urea - formaldehyde, melamine-formaldehyde, and other resins, preferably by blending about 25 to 50 weight percent of the heat-reactive resin, or mixtures thereof, with the instant epoxy resins. The rate of cure of the various resin combinations will depend on the particular resins selected and the curing temperature employed, but in general will require times in the order of about an hour at about 125° C. to several minutes at about 200° C., etc.

The instant epoxy resins can also be cured at room temperature by the incorporation therein of various polyamines such as ethylene diamine, diethylene triamine, triethylene tetraamine, and the like, to provide tack-free coatings in a few hours, with subsequent curing for several days. The time of curing for such compositions can be reduced to a matter of minutes by heating, as for example above about 100° C.

I claim:
1. A diglycidyl ether of dihydroxypolychlorobiphenyls having the formula

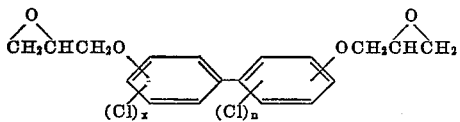

wherein the sum of $x$ and $n$ is a number from 5 to 8.

2. The diglycidyl ethers of claim 1, wherein the sum of $x$ and $n$ is about 7.

3. The diglycidyl ethers of claim 1, wherein the sum of $x$ and $n$ is about 6.

4. The diglycidyl ethers of claim 1, wherein the sum of $x$ and $n$ is about 5.

5. The diglycidyl ether of 4,4'-dihydroxyoctachlorobiphenyl.

6. The method of preparing a diglycidyl ether of dihydroxypolychlorobiphenyls having the formula

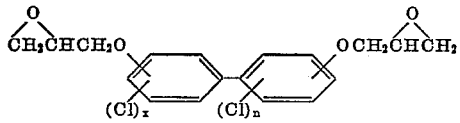

wherein the sum of $x$ and $n$ is a number from 5 to 8, comprising effecting the reaction of a dihydroxypolychlorobiphenyl and mixtures thereof defined by the structural formula

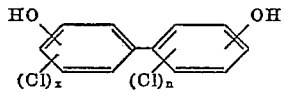

wherein the sum of $x$ and $n$ is a number from 5 to 8, with an excess of epichlorohydrin and from about 0.5 to about 1 mole of an alkali metal hydroxide, at a temperature of from about 90° C. to the reflux temperature of the reaction mixture to effect the formation of the 1-chloro-2-hydroxy-3-glyceryl ether of the biphenol; distilling off the excess epichlorohydrin; diluting the reaction mixture with an aromatic solvent; introducing from about 1.75 to about 2 moles of an alkali metal hydroxide per mole of biphenol and refluxing the reaction mixture to effect dehydrochlorination of the intermediate; removing the alkali metal salt and aromatic solvent; and recovering the diglycidyl ether.

7. The process of claim 6, wherein the epichlorohydrin is employed in an amount of from about 4 to about 10 moles per mole of biphenol.

8. The process of claim 7, wherein the alkali metal hydroxide is sodium hydroxide.

9. The process of claim 7, wherein the alkali metal hydroxide is potassium hydroxide.

10. The process of claim 8, wherein the aromatic solvent is benzene.

11. The process of claim 9, wherein the aromatic solvent is chlorobenzene.

12. An epoxy resin prepared by curing a diglycidyl ether of dihydroxypolychlorobiphenyls having the formula

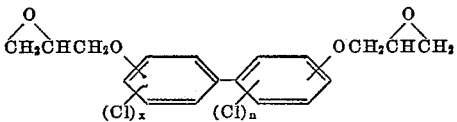

wherein the sum of $x$ and $n$ is a number from 5 to 8, with a member selected from the group consisting of a dihydroxypolychlorobiphenyl and mixtures thereof defined by the structural formula

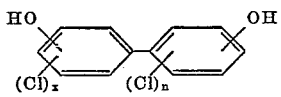

wherein the sum of $x$ and $n$ is a number from 5 to 8 at a curing temperature of from about 140° to about 200° C.

13. The method of curing a diglycidyl ether of polyhydric phenols to a higher epoxy resin comprising heating therewith from about 50 to about 100 mole percent of a member selected from the group consisting of a dihydroxypolychlorobiphenyl and mixtures thereof defined by the structural formula

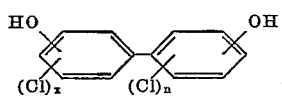

wherein the sum of $x$ and $n$ is a number from 5 to 8.

14. The method of claim 13, wherein the diglycidyl ether is selected from the group consisting of a diglycidyl ether of dihydroxypolychlorobiphenyls having the formula

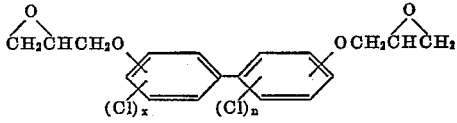

wherein the sum of $x$ and $n$ is a number from 5 to 8.

15. The method of claim 14, wherein the curing temperature is from about 140 to about 200° C.

16. The method of claim 13, wherein the diglycidyl ether is the diglycidyl ether of bis(p-hydroxyphenyl)dimethylmethane and the curing temperature is from about 140 to about 200° C.

References Cited in the file of this patent
UNITED STATES PATENTS

| | | |
|---|---|---|
| 2,449,088 | Smith | Sept. 14, 1948 |
| 2,615,008 | Greenlee | Oct. 21, 1952 |
| 2,849,416 | Bender et al. | Aug. 26, 1958 |